(12) United States Patent
Nielsen

(10) Patent No.: US 8,770,126 B2
(45) Date of Patent: Jul. 8, 2014

(54) METHOD AND APPARATUS FOR TOWING OFFSHORE WIND TURBINES

(75) Inventor: Finn Gunnar Nielsen, Bones (NO)

(73) Assignee: Statoil ASA, Stavanger (NO)

( * ) Notice: Subject to any disclaimer, the term of this patent is extended or adjusted under 35 U.S.C. 154(b) by 301 days.

(21) Appl. No.: 13/057,285

(22) PCT Filed: Aug. 3, 2009

(86) PCT No.: PCT/GB2009/001907
§ 371 (c)(1),
(2), (4) Date: Apr. 14, 2011

(87) PCT Pub. No.: WO2010/018359
PCT Pub. Date: Feb. 18, 2010

(65) Prior Publication Data
US 2011/0179986 A1 Jul. 28, 2011

(30) Foreign Application Priority Data
Aug. 11, 2008 (GB) .................................. 0814648.2

(51) Int. Cl.
*B63B 43/14* (2006.01)
*B63G 8/14* (2006.01)
*B63G 8/22* (2006.01)

(52) U.S. Cl.
USPC .......................................... 114/123; 114/245

(58) Field of Classification Search
USPC ......... 114/121–125, 267, 242, 244, 245, 253, 114/268; 290/44
See application file for complete search history.

(56) References Cited

U.S. PATENT DOCUMENTS

| | | | |
|---|---|---|---|
| 4,170,954 A * | 10/1979 | Rinaldi | 114/265 |
| 4,683,832 A * | 8/1987 | Dysarz | 114/258 |
| 7,112,010 B1 | 9/2006 | Geiger | |
| 7,242,107 B1 | 7/2007 | Dempster | |
| 8,169,099 B2 * | 5/2012 | Roznitsky et al. | 290/44 |
| 8,251,004 B2 * | 8/2012 | Olsen et al. | 114/258 |
| 8,471,396 B2 * | 6/2013 | Roddier et al. | 290/44 |
| 2004/0169376 A1 | 9/2004 | Ruer et al. | |
| 2006/0005617 A1 | 1/2006 | LeMieux | |
| 2006/0091678 A1 | 5/2006 | Macedo | |
| 2007/0001464 A1 | 1/2007 | Kothnur et al. | |
| 2010/0143046 A1 | 6/2010 | Olsen et al. | |

FOREIGN PATENT DOCUMENTS

| | | |
|---|---|---|
| CA | 2587877 | 11/2005 |
| CN | 1377319 A | 10/2002 |
| CN | 1390280 A | 1/2003 |
| CN | 1628197 A | 6/2005 |
| CN | 101169108 A | 4/2008 |
| DE | 10101405 | 1/2001 |
| DE | 10332382 A1 | 2/2005 |
| EP | 1429024 A2 | 6/2004 |

(Continued)

*Primary Examiner* — Daniel V Venne
(74) *Attorney, Agent, or Firm* — Sutherland Asbill & Brennan LLP

(57) ABSTRACT

A method of moving a floating wind turbine relative to a body of water, the floating wind turbine having a buoyant body with a nacelle at the upper end thereof, including the steps of floating the floating wind turbine in the body of water, and towing the floating wind turbine while holding the buoyant body in an inclined position, whereby the nacelle is held clear of the water. As the wind turbine is held in an inclined position, it can be towed through regions of shallower water than if it were in a vertical position.

20 Claims, 3 Drawing Sheets

(56) References Cited

FOREIGN PATENT DOCUMENTS

| | | |
|---|---|---|
| GB | 1022524 | 3/1966 |
| GB | 2344843 A | 6/2000 |
| GB | 2362938 A | 12/2001 |
| GB | 2378679 A | 3/2002 |
| GB | 2401387 A | 11/2004 |
| GB | 2407114 | 4/2005 |
| GB | 2423108 A | 8/2006 |
| IE | 010719 | 3/2002 |
| JP | 52-52412 | 9/1993 |
| NO | 322435 B1 | 10/2006 |
| WO | 01/34977 A1 | 5/2001 |
| WO | 02/01589 A1 | 2/2002 |
| WO | 02/052150 A1 | 7/2002 |
| WO | 03/004869 A1 | 1/2003 |
| WO | 2006/080850 A1 | 8/2006 |
| WO | 2006/132539 | 12/2006 |

\* cited by examiner

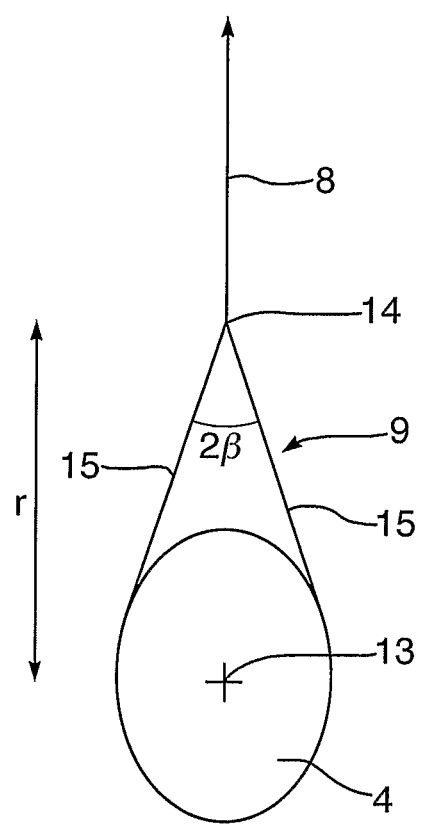

METHOD AND APPARATUS FOR TOWING OFFSHORE WIND TURBINES

TECHNICAL FIELD

The present invention relates to the field of floating wind turbines and, in particular, to a method and apparatus for moving an offshore floating wind turbine.

BACKGROUND OF THE INVENTION

As used herein, the term "floating wind turbine" means a wind turbine structure of the kind that is designed to float in a body of water when in use. Conventional floating wind turbines comprise a buoyant body having at its upper end a nacelle, which contains an electrical generator and other components, and a rotor. The body is generally long and approximately cylindrical in shape.

Offshore floating wind turbines are very large structures, the body being typically 100-200 meters in length and the rotor blades in the range of 40-70 meters long. They are assembled on shore or in protected waters and it is a significant challenge to move them to their desired location out at sea.

One approach is to tow them out to their installation sites through the water, whilst floating in the same, generally vertical, position in which they are used. This prevents the generator from being submerged under water or splashed, which could damage its components.

With this method, the choice of an installation site for the wind turbine and the possible routes thereto are therefore limited by the depth of the water through which the wind turbine must pass. If the water in a region is too shallow, the floating wind turbine cannot be towed through that region making some installation sites unreachable, or only reachable via an indirect, longer route.

As an alternative, methods of transporting wind turbines in an essentially horizontal position are known. However, these methods require a large vessel on which the wind turbine is supported in order to keep the delicate rotor and generator components away from the water. For example, GB 2423108 discloses mounting structures, such as offshore wind turbines, using socket foundations. The mounting structure is transported to the socket in an essentially horizontal (reclined) position, on board another vessel. In another example, GB 2344843 discloses a gravity securing system for offshore generating equipment. The generating equipment is towed to the installation site in an essentially horizontal (reclined) position, again on board another vessel. It will be appreciated that the use of such vessels increases the cost of transporting the wind turbine and their size may also restrict the choice of route or installation location.

SUMMARY OF THE INVENTION

According to the present invention there is provided a method of moving a floating wind turbine relative to a body of water, the floating wind turbine having a buoyant body with a nacelle at the upper end thereof, the method comprising floating the floating wind turbine in the body of water and towing the floating wind turbine whilst holding the buoyant body in an inclined position whereby the nacelle is held clear of the water.

Thus, the inventors have recognised that it is possible to float a wind turbine while it is transported in such a way that its draught can be significantly reduced whilst keeping the delicate components within the nacelle clear of the water. It can then be placed into the conventional vertical configuration prior to use. In this way it can pass through shallower water than if it were towed in a vertical position, and the number of possible installation sites is thereby increased. At the same time, the need for a vessel large enough to carry an entire wind turbine is avoided.

The angle of inclination to the surface of the water should be significant in order to provide a useful reduction in draught. The precise angle of inclination (from the surface) can vary depending on the circumstances and may be in the range of 20 to 60°. Usually 30 to 50° will be appropriate in order to achieve a useful reduction in draught whilst keeping the turbine clear of water. These angles represent the average angle. It will be apparent that there will be some degree of oscillation about the average due to the effect of waves and wind.

The body of the wind turbine forms its support structure. The support structure typically comprises a lower support structure, which, when installed, is generally mostly submerged, and a tower, which, when installed, is generally above the water line.

In the present invention, in order to position a floating wind turbine in an inclined position, a floating member may be attached to the lower support structure. The floating member enables the wind turbine system to be positioned and held in an inclined position by exerting an upward force on the lower support structure. The floating member could be any suitable buoyant structure, for example a buoyancy tank. When the wind turbine reaches the installation site, the floating member may be removed and the wind turbine can assume an essentially vertical position, suitable for operation. The floating member is therefore preferably detachable, although it could remain in place and be ballasted, e.g. by flooding it with water It is preferred that whilst the floating wind turbine is inclined, the force from the floating member may be adjusted so as to keep the wind turbine in static equilibrium. The force may be adjusted by the floating member, for example with water.

Additionally or alternatively to the floating member, a weight may be attached to the tower to further enable the positioning and holding of the wind turbine system in a desired inclined position by exerting a downward force on the tower. If a weight is attached, preferably it should be attached to the tower just above the water line in order to minimise the bending moments exerted on the support structure, which, if excessive, could lead to structural damage. However, it is most preferred that no such weight should be added, in order to avoid the wind turbine system becoming too submerged, which would risk damage to the wind turbine generator. If a weight is added, for the reasons discussed above in relation to the floating member, it is preferred that the weight should be detachable.

The floating member may be attached to the support structure by a line, for example a wire, chain or cable. In order to move the wind turbine from a vertical position to an inclined position, the length of the line may be reduced, for example by winching it into the floating member or the support structure.

In addition, a pair of almost horizontal forces (i.e. a couple) may be applied to the system in order to overcome the righting moment of the wind turbine whilst it is positioned at intermediate inclination angles. Such almost horizontal forces may be applied, for example, by a tug or (when close to the shore) by a winch with a wire fixed on land. In this discussion, an "almost horizontal force" means a force with an horizontal component that is significantly greater than its vertical component.

As noted previously, a wind turbine generator typically comprises a nacelle and a rotor The combined centre of gravity of these components is generally offset from the longitudinal axis of the support structure. As the centres of gravity and buoyancy of the support structure are located close to the longitudinal axis of the support structure, the inclined wind turbine may be in an unstable equilibrium and may tend to rotate about the longitudinal axis of the support structure. This can be a problem as it is important to keep the wind turbine generator out of the water to avoid damaging it.

In order to address this problem, a "crow foot" or "bridle" arrangement of lines may be used to attach the line from the floating member to the support structure. This may be formed of two lines, for example lengths of wire or cable, that connect either side of the support structure to the line from the floating member to form a Y-shaped arrangement of lines. This will help to ensure rotational stability of the system about the longitudinal axis of the support structure.

During tow-out of the wind turbine system, waves may excite the system and cause it to oscillate. It is desirable to minimise or eliminate any excitation of the system to prevent water damage to the generator.

The most energetic waves generally have a period of around 5 to 20 seconds. Therefore, in order to reduce or eliminate excitation of the system due to heave (almost purely vertical displacement of the system), the natural periods of oscillation of the inclined system should preferably be outside of the range of approximately 5 to 20 seconds, i.e. not equal to the period of the most energetic waves. Preferably, the natural periods of the system should be greater than 20 seconds. However, in some cases, such as where the stiffness of the system is too great for this to be a practical choice, some of the natural periods of the system could be less than 5 seconds.

In order to achieve such natural periods of the system and minimize the dynamic interaction between heave and pitch motions, the distance from the centre of gravity to the waterline around the support structure should ideally be approximately equal to the distance from the centre of gravity to the point of attachment of the buoyancy tank.

In order to reduce or eliminate excitation of the system due to pitch (rotation of the system about its centre of gravity), the centre of buoyancy of the system should ideally be close to its centre of gravity.

Thus, it will be seen that the invention in its broadest sense relates to the provision of a floating wind turbine in an inclined position whereby it can be towed through water with a lesser draught than if it were in the vertical configuration in which it is used, whilst the nacelle remains clear of the water.

The invention also extends to a floating wind turbine in such a configuration and to one that is adapted to be held in such a configuration by the provision of one or more float(s) and optionally one or more weight(s). Furthermore, the invention extends to a method of installing an offshore floating wind turbine comprising constructing the offshore floating wind turbine, transporting it to its installation site according to the method previously described, placing the floating wind turbine into its vertical configuration and installing it. The last step generally comprises tethering or mooring the structure to the seabed.

These and other features and improvements of the present application will become apparent to one of ordinary skill in the art upon review of the following detailed description when taken in conjunction with the several drawings and the appended claims.

BRIEF DESCRIPTION OF THE DRAWINGS

Preferred embodiments of the invention will now be described by way of example only and with reference to the following drawings in which:

FIG. 5 is another vertical cross section through a tower, with a crows foot device attached thereto, in a plane orthogonal to that shown in FIG. 4.

DETAILED DESCRIPTION

Figure 1:
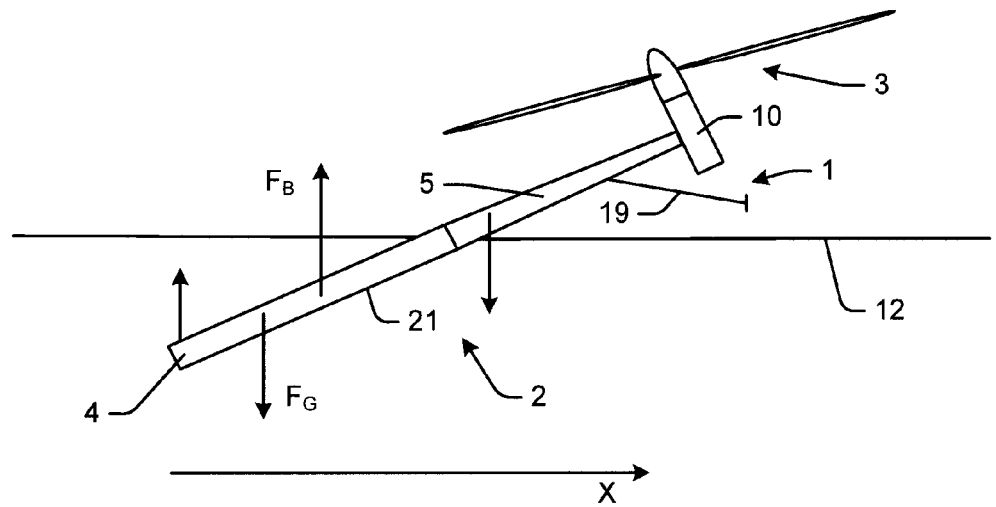
FIG. 1 illustrates the forces acting on a preferred embodiment of a floating wind turbine in an inclined position.

FIG. 1 shows the forces acting on a preferred embodiment of a floating wind turbine (hereafter "wind turbine") 1 in an inclined position. The wind turbine 1 comprises a support structure 2 and a wind turbine generator 3. The support structure 2 comprises a lower support structure 4 and a tower 5. The wind turbine generator 3 comprises a nacelle 10 and a rotor 11. $F_G$ is the weight of the wind turbine 1. $F_B$ is the buoyancy force of the wind turbine 1.

In order to keep the wind turbine 1 in an inclined position, an upwardly directed force $F_1$ is required. As illustrated in FIG. 1, $F_1$ should act from a position on the lower support structure 4 that is below the centre of gravity of the wind turbine 1. Optionally, a downwardly directed force $F_2$ acting above the centre of buoyancy may also be applied to the wind turbine 1.

The inclined floating position of the wind turbine 1 should be stable. This requires a stable equilibrium of forces and moments in the vertical plane through the longitudinal axis of the support structure 2. Considering the forces indicated in FIG. 1, this means that:

$$F_B + F_1 - F_G - F_2 = 0 \tag{1}$$

and $$F_1 x_1 - F_G x_G + F_B x_B - F_2 x_2 = 0 \tag{2}$$

where $F_B$, $F_1$, $F_G$ and $F_2$ are defined above and in FIG. 1, and $x_1$, $x_G$, $x_B$ and $x_2$ are the horizontal coordinates of where the forces $F_1$, $F_G$, $F_B$ and $F_2$, respectively, act on the wind turbine 1.

Figure 2:
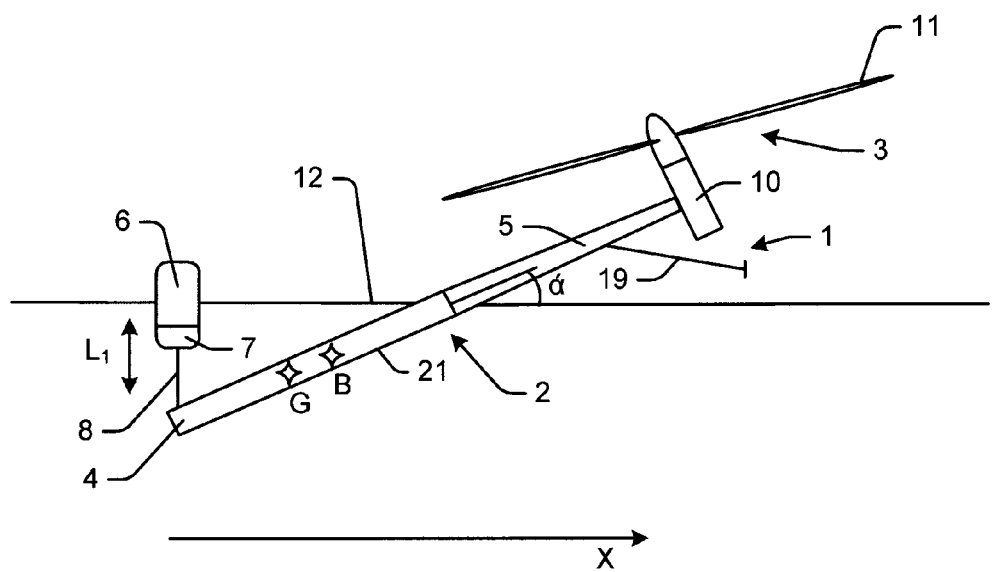
FIG. 2 illustrates the forces acting on a preferred embodiment of a floating wind turbine with a floating member attached thereto.

The forces $F_1$ and $F_2$ could be applied to the wind turbine 1 by, for example, a buoyancy tank 6 attached to the lower support structure 4, as shown in FIG. 2, and a clump weight (not shown) attached to the tower 5 close to the water line 12, respectively. If the clump weight were attached higher up the tower 5, it would contribute more effectively with respect to inclining the wind turbine but it could introduce large bending moments in the tower 5, which could bend or damage the structure of the tower 5.

A further problem associated with applying an external force $F_2$ to the wind turbine 1, is that it can result in an undesirable greater submergence of the wind turbine 1 (unless further modifications to its buoyancy are made). It is therefore preferred that in most cases $F_2$ should be set equal to zero and no clump weight or similar should be attached.

Ideally, the wind turbine 1 should (for this part of the operation) be designed such that its centre of gravity G should be as close to the centre of buoyancy B as practically possible (see FIG. 2). By positioning G and B as close together as possible, this reduces the required magnitude of $F_1$. The required magnitude of $F_1$ can also be reduced by making $F_1$ act on the wind turbine 1 as far down the lower support structure 4 as possible, as shown in FIG. 1.

As shown in FIG. 2, the buoyancy tank 6 may contain ballast 7, such as water. By altering the amount of ballast 7 in the buoyancy tank 6, the magnitude of force $F_1$ may be adjusted. The buoyancy tank 6 may include any type of conventional access for adding or removing water therefrom via a pump and the like. This may also be achieved by adjusting the length $L_1$ of a line 8 shown in FIG. 2.

The buoyancy tank 6 is a floating member that is connected to the lower support structure 2 via the line 8. The length of the line 8 may be shortened or lengthened via a winch 17 attached to either the buoyancy tank 6 or the lower support structure 4. By winching the line 8 in or out, the depth $L_1$ of the end of the lower support structure 2 beneath the water line 12 can be varied.

The wind turbine 1 can be placed in an inclined position by adjusting the length of the line 8 to vary the depth $L_1$ until the wind turbine 1 has the desired inclination angle $\alpha$, as shown in FIG. 2.

Figure 3:
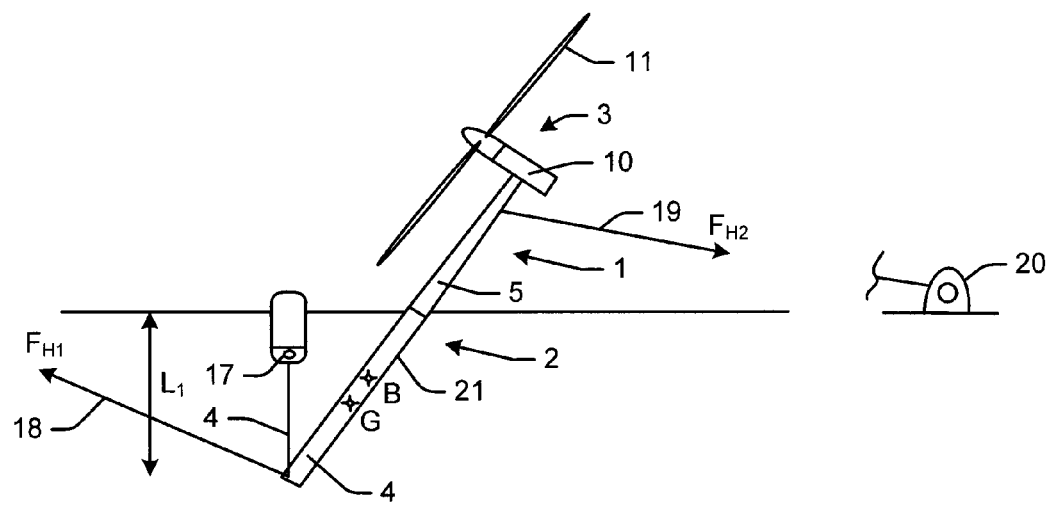
FIG. 3 illustrates the forces acting on a preferred embodiment of a floating wind turbine with a floating member attached thereto and almost horizontal forces being applied to the system.

In order to move the wind turbine 1 from an initial vertical position to an inclined position for towing, the line 8 is initially relatively long. The depth $L_1$ is then reduced by winching in the line 8. Simultaneously, as shown in FIG. 3, a pair of almost horizontal forces $F_{H1}$ and $F_{H2}$ are applied to the wind turbine 1 in order to overcome the righting moment of the wind turbine 1 in the intermediate inclination angles, while it is being moved from a substantially vertical position, to a stable inclined position.

The pair of almost horizontal forces $F_{H1}$ and $F_{H2}$ can be applied by using a tug or a winch together with a wire fixed on land, for example. The required magnitude of these forces $F_{H1}$ and $F_{H2}$ may be determined by considering the static equilibrium of the wind turbine 1 in all inclination angles from 90 degrees to the actual inclined position. FIG. 3 shows the pair of almost horizontal forces $F_{H1}$ and $F_{H2}$ applied by a line 18 and a line 19. The lines 18, 19 may be in communication with a winch 20 fixed on land or elsewhere.

The actual inclination angle $\alpha$ is chosen with consideration given to the depth of the water through which the wind turbine 1 is to be towed, the length of the wind turbine 1 below the water line 12 and the height of the nacelle 10 and rotor 11 of the wind turbine generator 3 above the water line 12. Ideally, the wind turbine 1 should be in an inclined position such that there is simultaneously sufficient clearance above the water line 12 for the nacelle 10 and rotor 11 so that they do not get wet and a sufficient reduction in draft.

The inclined wind turbine 1 should ideally also be stable with respect to rotation about its longitudinal axis.

Figure 4:
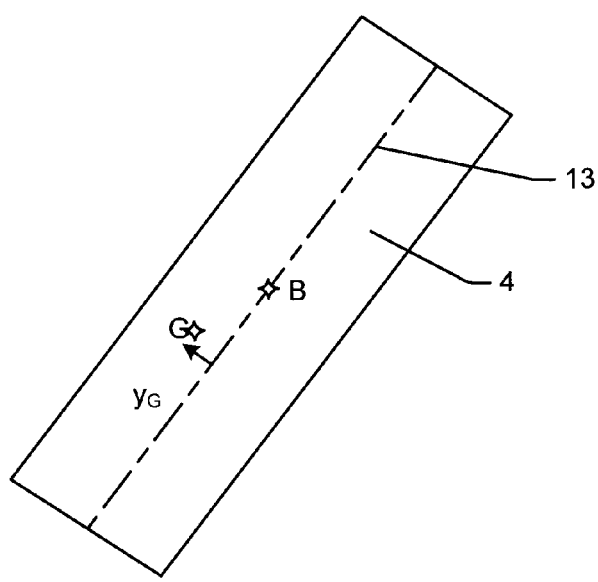
FIG. 4 shows the location of the centre of gravity of the system in a lengthwise vertical cross section of the tower.

FIGS. 2 and 3 show towing the wind turbine 1 whilst holding the support structure 2 as a buoyant body 21 in an inclined position by repositioned line 19. If the wind turbine 1 is towed in the inclined position as illustrated in FIG. 1, the combined centre of gravity of the nacelle 10 and rotor 11 in most cases will be located above the longitudinal axis 13 of the support structure 2. The centre of gravity of the support structure 2 is usually located close to the longitudinal axis 13. The centre of buoyancy of the support structure 2 is also usually located close to the longitudinal axis 13. However, as the combined centre of gravity of the nacelle 10 and rotor 11 is usually located above the longitudinal axis 13, the centre of gravity G of the whole wind turbine 1 is thus also located slightly above the longitudinal axis 13, as shown in FIG. 4. Therefore, any slight movement of the wind turbine 1 about the longitudinal axis 13 will thus tend to cause rotation of the wind turbine 2 about the longitudinal axis 13. Due to this unstable equilibrium, the wind turbine 1 would tend to end up in a floating position with the rotor 11 located beneath the longitudinal axis 13 and therefore closer to the water line 12, where it may be more likely to be splashed by waves, or possibly even submerged.

In order to avoid this happening, the buoyancy tank 6 can be used to introduce a sufficient righting moment to compensate for the moment introduced by the asymmetry of the weight distribution of the wind turbine 1 about the longitudinal axis 13.

As illustrated in FIG. 4, the centre of buoyancy B of the wind turbine 1 is located approximately on the longitudinal axis 13 and the centre of gravity G of the wind turbine 1 is located a distance $y_G$ from the axis 13. When the support structure 2 is inclined at an angle $\alpha$ to the horizontal, there is a moment $M_G$ from the weight of the wind turbine 1 about the axis 13, which can be written as follows:

$$M_G = -\theta m g y_G \cos \alpha \qquad (3)$$

where m is the mass of the wind turbine 1, g is the acceleration due to gravity and $\theta$ is the angle of rotation about the axis 13. $\theta$ is assumed to be small in the stability considerations. The negative sign indicates that the moment $M_G$ is destabilising.

The moment $M_G$ may be compensated for by a moment from the buoyancy force $F_1$ (and possibly the weight $F_2$, if present). The buoyancy tank 6 can be connected to the support structure by a single line 8 at a distance $y_F$ from the axis 13. The righting moment $M_{F1}$ from the buoyancy force $F_1$ can then be written as follows:

$$M_{F1} = \theta F_1 y_F \cos \alpha. \qquad (4)$$

In order for the system to be stable with respect to rotation about the axis 13, this therefore requires that:

$$M_{F1} + M_G > 0 \qquad (5)$$

and $$F_1 y_F > m g y_G. \qquad (6)$$

In most cases $mg \gg F_1$. Therefore, according to requirement (6), it should be required that $y_F \gg y_G$ in order to ensure stability. If $y_F$ is not sufficiently large, it may be increased by using a crow foot 9 at the end of the line 8 between the buoyancy tank 6 and the support structure 2, as shown in FIG. 5.

When a crow foot 9 is used, the moment $M_{F1}$ about the axis 13 from the buoyancy force $F_1$ can be written as follows:

$$M_{F1} = \theta F_1 r \cos \alpha \qquad (7)$$

where r is the vertical distance from the axis 13 of the support structure 2 to the top point 14 of the crow foot 9. As $r > y_F$, the rotational stability of the system about the axis 13 is increased by using the crow foot 9.

Equation (7) is valid when $\theta \cos \alpha < \tan \beta$ (assuming small rotation angles $\theta$), where $\beta$ is half of the angle between the two lines 15 of the crow foot 9, as indicated in FIG. 5. If the rotation angle $\theta$ exceeds $\tan \beta / \cos \alpha$, then one of the lines 15 of the crow foot 9 will become slack and the effect of the crow foot 9 will disappear. However, as the rotation angle $\theta$ is generally small, the crow foot 9 can be an effective means for achieving the required stability in relation to, rotation about the axis 13 of the support structure 2.

Stability may also be obtained or improved by adjusting the position of internal ballast contained within the support structure 2. In this way, $y_G<0$ (i.e. the centre of gravity being located beneath the longitudinal axis 13 of the support structure 2) may be obtained.

As well as the static stability of the system, it is also important to consider its dynamic stability. Waves can be the most important sources of dynamic excitation during tow-out of a wind turbine 1. The dynamic response of the wind turbine 1 should ideally be limited as much as possible in order to avoid possible wetting of the nacelle 10 and rotor 11 and in order to limit the possible dynamic load on the tower 5 and lower support structure 4.

A full assessment of the dynamic loads on the system caused by waves requires a coupled dynamic analysis, where the effect of the wind turbine 1 itself, the buoyancy tank 6 and possible clump weight, as well as all wire arrangements including the towing wire are included in the analysis. The wave forces, hydrodynamic mass and damping should also be considered.

However, in general, it is important for the natural periods of the system to be outside of the range of periods of the most energetic waves, i.e. outside of the range of approximately 5 to 20 seconds.

An initial estimate of the system's natural periods can be obtained by considering an uncoupled system. The parameters of the buoyancy tank 6 and its location can then be adjusted so that requirements for both static and dynamic equilibrium are fulfilled.

Heave motion is an almost entirely vertical displacement of the system. The inertia $M_{33}$ involved in such an oscillation can be written as follows:

$$M_{33} = m + A_{33} \cong m + \rho V \cos^2 \alpha \tag{8}$$

where $M_{33}$ is the effective mass for vertical heave oscillations, m is the total dry mass of the system (including the buoyancy tank 6 and possible clump weight), $A_{33}$ is the hydrodynamic mass in heave of the support structure 2 and $\rho V$ is the mass of the displaced water. For simplicity, it is assumed that the displacement and added mass of the buoyancy tank and possible clump weight are much less than the corresponding values for the wind turbine 1.

The restoring force coefficient $C_{33}$ in the heave direction can be determined from the water plane area of the inclined support structure 2 and the buoyancy tank 6 as follows:

$$C_{33} = \rho g \left( \frac{\pi R^2}{\cos \alpha} + A_1 \right) \tag{9}$$

where R is the radius of the support structure 2 (which, for simplicity, is assumed here to have a circular cross section) and $A_1$ is the water plane area of the buoyancy tank 6.

The natural period $T_3$ of the system for a pure, un-damped heave motion can then be written as follows:

$$T_3 \cong 2\pi \sqrt{\frac{M_{33}}{C_{33}}} . \tag{10}$$

In order to avoid the range of periods of the most energetic waves (i.e. from about 5 to 20 seconds), $T_3$ should ideally be greater than about 20 seconds.

In order to avoid too strong coupling between heave and pitch, the two terms in equation (9) for $C_{33}$ should be approximately equal. Moreover, the distance from centre of gravity G to the water line 12 of the support structure 2 should be approximately equal to the distance from centre of gravity G to the point of attachment of the buoyancy tank 6 to the support structure 2. In other words, as shown in FIG. 3, the centre of gravity G should be about halfway between the point of attachment of the buoyancy tank 6 to the support structure 2 and the point where the support structure 2 passes through the water line 12.

It is also important to consider pitch. $M_{55}$ is the contribution to the inertia of the system due to pitch rotation around the centre of gravity G of the wind turbine 1 and it can be written as follows:

$$M_{55} = I_{55} + A_{55} \cong I_{55} + \frac{1}{12}\rho \pi R^2 L^3 + \rho \pi R^2 L (\xi_G - \xi_B)^2 \tag{11}$$

where $I_{55}$ is the moment of inertia of the wind turbine 1 about the centre of gravity G and $A_{55}$ is the hydrodynamic inertia of the submerged part of the support structure 2. The approximate expression given in the second part of equation (11) is obtained by assuming the support structure 2 is a long, slender cylinder with a constant radius. The coordinate $\xi$ is measured along the axis 13 of the support structure 2 such that $x = \xi \cos \alpha$. L is the length of the submerged part of the support structure 2.

In a similar way, the pitch restoring coefficient $C_{55}$ can be written as follows:

$$C_{55} = \rho g A_1 (x_G - x_{F_1})^2 + \frac{\rho g \pi R^2}{\cos \alpha}(x_G - x_{WL})^2 \tag{12}$$

where $x_{WL}$ is the x-coordinate of the centre of the water plane area of the support structure 2.

The natural period of the system in pitch $T_5$ can then be written as follows:

$$T_5 \cong 2\pi \sqrt{\frac{M_{55}}{C_{55}}} . \tag{13}$$

If the system is not approximately symmetric about the centre of gravity G of the wind turbine 1, the coupled heave-pitch equations of the system should be solved. This would involve coupled inertia and restoring terms of the form $M_{35}$ and $C_{35}$.

As with the case for heave, and for the same reasons, ideally $T_5 > 20$ seconds. However, in certain cases, for example where the stiffness of the system is particularly large, $T_5 < 5$ seconds would be a more practical choice.

From equation (12), it can be seen that the symmetry of the system would be improved if:

$$A_1 \cong \frac{\pi R^2}{\cos \alpha} . \tag{14}$$

Furthermore, the moment of inertia $I_{55}$ in equation (11) should have a minimum value close to centre of gravity G. This requirement is generally fulfilled for the contribution related to the dry mass of the system. It will also be approximately fulfilled for the hydrodynamic mass of the system if the centre of buoyancy B is close to the centre of gravity G.

A further type of motion that should be considered is roll. Roll about the axis 13 of the support structure 2 is generally only weakly coupled to the other modes of motion (heave and pitch). The inertia in roll generally has only an insignificant contribution from hydrodynamic effects. This means that roll inertia $M_{44}$ can be written as follows:

$$M_{44} = I_{44} + A_{44} \cong I_{44} \tag{15}$$

The restoring effects against roll come from the possible clump weight and the buoyancy tank 6, as discussed above. For small roll angles it can be assumed that the buoyancy force $F_1$ remains approximately constant. (The same is also true for $F_2$).

Considering only the buoyancy tank 6, and not a possible clump weight, the roll restoring force $C_{44}$ can be written as follows:

$$C_{44} = -mgy_G + F_1 r \cos \alpha \tag{16}$$

and the natural period in roll $T_4$ can then be written as follows:

$$T_4 \cong 2\pi \sqrt{\frac{M_{44}}{C_{44}}}. \tag{17}$$

It should be apparent that the foregoing relates only to the preferred embodiments of the present application and that numerous changes and modification may be made herein by one of ordinary skill in the art without departing from the general spirit and scope of the invention as defined by the following claims and the equivalents thereof.

I claim:

1. A method of moving a floating wind turbine relative to a body of water, the floating wind turbine having a buoyant body forming a support structure with a nacelle at the upper end thereof, the method comprising: floating the floating wind turbine in the body of water; and towing the floating wind turbine whilst holding the buoyant body in an inclined position, whereby the nacelle is held clear of the water;
    wherein the floating wind turbine is held in an inclined position by a floating member;
    wherein a wind turbine generator is provided at the nacelle and the floating member is attached by a line to the support structure.

2. A method as claimed in claim 1, comprising winching the line into or out of the floating member or support structure.

3. A method as claimed in claim 1, further comprising applying horizontal or almost horizontal forces to the floating wind turbine.

4. A method as claimed in claim 3, wherein the horizontal or almost horizontal forces are applied by tug or a winch with a wire fixed on land.

5. A method as claimed in claim 1, further comprising adjusting a buoyancy force exerted by the floating member so as to maintain the floating wind turbine in static equilibrium.

6. A method as claimed in claim 5, wherein the buoyancy force is adjusted by adding or removing ballast to or from the floating member.

7. A floating wind turbine system, comprising a floating wind turbine and a floating member, the floating wind turbine comprising a buoyant body that forms a support structure, a wind turbine generator, and wherein the floating member is arranged so that the buoyant body is held in an inclined position whilst the floating wind turbine is being towed in a body of water;
    wherein the floating wind turbine is held in an inclined position by the floating member
    wherein the wind turbine generator is provided at a nacelle and the floating member is attached by a line to the support structure.

8. A system as claimed in claim 7, further comprising a weight.

9. A system as claimed in claim 8, wherein the weight is attached to the support structure.

10. A system as claimed in claim 8, wherein the support structure comprises a lower support structure and a tower.

11. A system as claimed in claim 10, wherein the floating member is attached to the lower support structure.

12. A system as claimed in claim 10, wherein the weight is attached to the tower.

13. A system as claimed in claim 12, wherein the weight is attached to the tower close to the water line.

14. A system as claimed in claim 7, wherein the floating member is a buoyancy tank.

15. A system as claimed in claim 7, wherein the line is adapted to be winched into or out of the floating member or support structure.

16. A system as claimed in claim 7 further comprising a crow foot adapted to attach the line to the support structure.

17. A system as claimed in claim 7, wherein a natural period of oscillation of the system is outside of the range of 5 to 20 seconds.

18. A system as claimed in claim 7, wherein a natural period of oscillation of the system is greater than 20 seconds.

19. A system as claimed in claim 7, wherein a natural period of oscillation of the system is less than 5 seconds.

20. A system as claimed in claim 7, wherein a distance from a centre of gravity of the system to a water line of the support structure is approximately equal to a distance from a centre of gravity of the system to a point of attachment of the floating member.

* * * * *